Patented Sept. 4, 1934

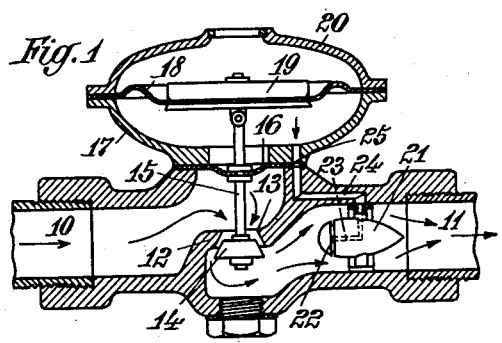

1,972,234

UNITED STATES PATENT OFFICE 1,972,234

DIAPHRAGM PRESSURE REGULATOR

Rudolf Neumann, Berlin-Charlottenburg, Germany

Application June 15, 1931, Serial No. 544,659
In Germany July 31, 1930

2 Claims. (Cl. 50—24)

The invention relates to diaphragm pressure regulators for gas and other gaseous agents. Regulators of this class suffer from the drawback that when great quantities of gas are drawn off, the discharge pressure, that is the pressure behind the regulator, is no longer constant, but decreases the greater the quantity of the gas withdrawn.

In order to overcome this disadvantage diaphragm pressure regulators have been designed which possess a special controlling chamber that is in communication with a space in which the discharge pressure prevails. In order to obtain an additional further opening of the regulator valve when great quantities of gas are withdrawn, nozzles have been provided in this space which nozzles exert a suction action upon the controlling chamber. This suction action increases with increasing quantity of gas passing through the nozzle, whereby the gas is sucked from the controlling chamber and an additional opening motion is imparted to the valve of the regulator. The provision of this simple nozzle results in the feature that the pressure prevailing at the discharge end of the regulator remains constant.

The present invention has for its object to improve this suction effect at the discharge end of the regulator, which object is attained by providing a special suction-regulating member in lieu of the nozzle hitherto used, which latter, due to the required properties of flow, has a comparatively great structural length. Furthermore, if the special suction-regulating member is movably mounted on the stem of the regulating valve, it allows a regulation of the suction effect in dependency upon the position of the valve.

In order that the invention may be clearly understood and readily carried into effect, two embodiments of the same are illustrated by way of example in the accompanying drawing in which Figure 1 is a vertical section through a regulator forming the first embodiment, Figure 2 shows the rear end thereof with the special suction-regulating member on enlarged scale, Figure 3 shows the other embodiment in which the special suction-regulating member is arranged in such a manner that its suction effect may alter in dependency upon the position of the regulating valve, Figures 4 and 5 illustrate the suction-regulating member of the other embodiment in two different positions in which a smaller and a greater suction effect respectively, are attained, Figure 6 illustrates a further modification in which the suction-regulating member at the same time forms the regulating valve.

Referring first to Figures 1 and 2, 10 denotes the pipe through which the gas enters the regulator and 11 is the discharge pipe of the latter. The corresponding spaces of the casing of the regulator are separated from one another by a partition 12 in which the valve seat 13 is disposed. With this seat co-operates the valve 14 fixed to a stem 15. The entrance space is closed at the top by a diaphragm 16 fixed to the casing and to the valve stem 15. Furthermore a controlling chamber 17 is attached to the regulator casing which chamber is closed at the top by another diaphragm 18 loaded by a weight 19 and protected by a cover 20.

According to the invention a special suction-regulating member 21 having the shape of a needle is disposed in the discharge space of the regulator by which needle, as a result of its peculiar configuration, to be seen from the drawing, a reduction of the discharge passage area is obtained in the same way as hitherto effected by the usual nozzle. By this reduction of area a suction effect is obtained, which can act upon the controlling chamber 17 through a duct formed by an annular groove 22, a channel 23 provided in the member 21 and a passage 24, 25 communicating therewith and leading to chamber 17, as will clearly be seen from Figures 1 and 2. This regulating needle 21 affords the advantage, when compared with the nozzle hitherto used, that it can be manufactured in a very simple way by turning on a lathe and that it can be replaced very readily.

Researches as to the conditions of flow produced by such regulating needles have proved that these needles need not be manufactured with the care required in the manufacture of the nozzles hitherto used. While such a nozzle must be calculated and turned inside most carefully, this care is not required in the manufacture of the regulating needle according to the invention. On the contrary, this needle may, for instance, be drawn from sheet metal and slight inaccuracies and deviations from the calculated shape do not impair its suction effect. The annular groove 22 is best disposed in the zone of the highest suction effect. The needle 21 is advantageously held in position in the discharge end of the regulator casing by two arms 26, 27 which may be designed like the well-known expanding rings. In this way the regulating needle can be very easily mounted and removed.

In the embodiment illustrated in Figure 3 the needle is not fixedly arranged in the discharge space of the regulator but is fixed to the valve stem 30, which has a passage opening at 38 leading into the controlling chamber 35 that corresponds to chamber 17 of the first embodiment. The valve 34 with seat 33 likewise corresponds to the valve 13, 14 of Figure 1. The controlling chamber 35 is again closed by two diaphragms 36 and 37. In contradistinction to the first embodiment the suction effect acting upon the controlling chamber is not transmitted through a duct provided in the wall of the casing but through the groove 40, Figures 4, 5, and the passage mentioned provided in the valve stem 30 and opening at 38 into chamber 35. In order to attain a variable suction effect, a contraction 39 is provided in the discharge space which co-operates with the needle, which when moving with the valve 34 more or less immerges in this contracted portion.

In Figure 4 the needle is shown in its uppermost position, in which merely the suction produced by the needle itself is effective. However, when the valve is opened to a greater extent, the needle assumes the position shown in Figure 5 in which two suction effects jointly act at the groove 40, viz the effect produced by the needle itself and that produced by the contraction 39. Hence, when the valve is open to a greater extent, a greater suction effect is produced than when the valve is less widely open.

In the modification shown in Figure 6 the upper portion 41 of the needle forms, at the same time, at 42, the valve of the regulator, as will be clear without any further explanation. Also in this case the contraction 39 may be provided to improve the suction effect.

What I claim and desire to secure by Letters Patent is:—

1. A gas pressure regulator having an inlet channel and an outlet channel, an intake chamber and a discharge chamber, a controlling diaphragm, a regulating valve which is actuated by the said controlling diaphragm and located between the said chambers and means whereby a suction effect is produced upon the controlling diaphragm in dependence upon the volume of gas flowing through the device, said means comprising a solid body of stream-line shape, having a relatively blunt leading end and a long, tapering trailing end, which is disposed in the outlet channel and which is surrounded wholly by the gas flow passing by, and which has openings therein located in the neighborhood of the region where the highest gas velocity occurs, a second diaphragm, said two diaphragms forming a control chamber between them, and means affording communication between the openings in the body and the said control chamber.

2. A gas pressure regulator having an inlet channel and an outlet channel, an intake chamber and a discharge chamber, a controlling diaphragm, a regulating valve which is actuated by the said controlling diaphragm and located between the said chambers, and means whereby a suction effect is produced upon the controlling diaphragm in dependence upon the volume of gas flowing through the device, said means comprising a solid body of stream-line shape, having a relatively blunt leading end and a long, tapering, trailing end, which is connected rigidly to the said regulating valve and projecting into the said outlet channel, said body being wholly surrounded by the flow of gas passing by and having openings therein located adjacent the highest gas velocity zone, a stream-line shaped contraction in the outlet channel adapted to co-operate with the stream-line shaped body, a second diaphragm, said two diaphragms forming a control chamber between them, and means affording communication between the openings in the body and the said control chamber.

RUDOLF NEUMANN.